(12) United States Patent
Chen

(10) Patent No.: US 7,684,656 B2
(45) Date of Patent: Mar. 23, 2010

(54) FIBER OPTIC TEMPERATURE AND PRESSURE SENSOR AND SYSTEM INCORPORATING SAME

(75) Inventor: Yuehua Chen, Southampton (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/916,718

(22) PCT Filed: Jun. 20, 2006

(86) PCT No.: PCT/GB2006/002241
§ 371 (c)(1),
(2), (4) Date: Dec. 6, 2007

(87) PCT Pub. No.: WO2007/003876
PCT Pub. Date: Jan. 11, 2007

(65) Prior Publication Data
US 2008/0212917 A1    Sep. 4, 2008

(30) Foreign Application Priority Data
Jul. 2, 2005    (GB) ................... 0513615.5

(51) Int. Cl.
*G02B 6/00* (2006.01)
*G02B 6/26* (2006.01)
(52) U.S. Cl. .............. 385/12; 385/14; 385/15
(58) Field of Classification Search .......... 385/12, 385/14, 15
See application file for complete search history.

(56) References Cited
U.S. PATENT DOCUMENTS
3,885,874 A * 5/1975 Haas et al. ............. 356/450
(Continued)

FOREIGN PATENT DOCUMENTS
GB    2399877 A    9/2004

OTHER PUBLICATIONS
Chmielewska, Ewa; Urbanczyk, Waclaw; and Bock, Wojtek J.; "Measurement of pressure and temperature sensitivities of a Bragg grating imprinted in a highly birefringent side-hole fiber"; Applied Optics, vol. 42, No. 31, Nov. 1, 2003, pp. 6284-6291.
(Continued)

*Primary Examiner*—K. Cyrus Kianni
(74) *Attorney, Agent, or Firm*—Rodney Warfford; Daryl R. Wright; Trop Pruner Hu P.C.

(57) ABSTRACT

A sensing system including a sensor having an enclosure that defines a chamber, a fiber optic segment extending from outside the enclosure into the chamber, and a sequence of optical processing elements within the chamber. The elements include a fiber Bragg grating, a polarizer, a side hole fiber, and a mirror. A light source is arranged to direct light to the sensor(s). A spectral analyzer is arranged to detect light reflected back from the sensor(s). The fiber Bragg grating substantially reflects a first spectral envelope while transmitting the remainder of the optical spectrum to the polarizer and side hole fiber. The polarizer, side hole fiber, and mirror cooperate to return an optical signal within a second spectral envelope. The characteristic wavelength of a peak in the first spectral envelope is highly sensitive to temperature and relatively weakly sensitive to pressure. The period of the optical signal within the second spectral envelope is highly sensitive to pressure and relatively weakly sensitive to temperature. The spectral analyzer measures these spectral components to simultaneously derive a measure of temperature and pressure that effectively compensates for temperature-pressure cross-sensitivity of the sensor(s).

16 Claims, 2 Drawing Sheets

U.S. PATENT DOCUMENTS

| | | | |
|---|---|---|---|
| 4,659,923 A | | 4/1987 | Hicks, Jr. |
| 4,918,751 A | | 4/1990 | Pessot et al. |
| 5,367,399 A | * | 11/1994 | Kramer .................. 359/206.1 |
| 5,380,995 A | | 1/1995 | Udd et al. |
| 5,515,459 A | | 5/1996 | Farhadiroushan |
| 5,757,487 A | | 5/1998 | Kersey |
| 5,841,131 A | | 11/1998 | Schroeder et al. |
| 5,898,804 A | * | 4/1999 | Wickham .................... 385/37 |
| 6,212,306 B1 | | 4/2001 | Cooper et al. |
| 6,215,809 B1 | * | 4/2001 | Ziari et al. .................... 372/96 |
| 6,538,739 B1 | * | 3/2003 | Visuri et al. ................ 356/394 |
| 6,630,658 B1 | * | 10/2003 | Bohnert et al. ......... 250/227.14 |
| 6,765,724 B1 | * | 7/2004 | Kramer ...................... 359/566 |
| 7,003,184 B2 | * | 2/2006 | Ronnekleiv et al. ........... 385/12 |
| 2002/0041723 A1 | * | 4/2002 | Ronnekleiv et al. ........... 385/12 |
| 2002/0041724 A1 | * | 4/2002 | Ronnekleiv et al. ........... 385/12 |
| 2003/0076594 A1 | * | 4/2003 | Kramer ...................... 359/569 |
| 2003/0095263 A1 | * | 5/2003 | Varshneya et al. .......... 356/477 |

OTHER PUBLICATIONS

Thevenaz, L.; Le Floch, S.; Alasia, D.; and Troger, J.; "Novel schemes for optical signal generation using laser injection locking with application to Brillouin sensing"; Institute of Physics Publishing, Measurement Science and Technology; 15, pp. 1519-1524; Jul. 19, 2004.

Jansen, K. and Dabkiewicz, Ph.; "High pressure fiber-optic with side-hole fiber"; SPIE, vol. 798, Fiber Optic Sensors II, 1987, pp. 56-60.

* cited by examiner

FIBER OPTIC TEMPERATURE AND PRESSURE SENSOR AND SYSTEM INCORPORATING SAME

BACKGROUND OF THE INVENTION

1. Field of the Invention

This invention relates to fiber optic sensors for measuring temperature and pressure and to systems based thereon.

2. Description of Related Art

Optical fibers generally include a cylindrical core, a concentric cylindrical cladding surrounding the core, and a concentric cylindrical protective jacket surrounding the cladding. The core is made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

The refractive index of a transparent medium is the ratio of the velocity of light in a vacuum to the velocity of light in the medium. As a beam of light enters a medium, the change in velocity causes the beam to change direction. More specifically, as a beam of light travels from one medium into another medium, the beam changes direction at the interface of the two media. In addition to changing direction at the interface of two media, a portion of the incident beam is reflected at the interface such that the energy of the beam traveling through the second medium is diminished (the sum of the energy of the refracted and reflected beams must equal the energy of the incident beam). The angles of reflection and refraction can be predicted using Snell's law if the refractive indices of both media are known.

By altering the indices of refraction of two adjacent media, the angle of refraction and the angle of reflection of a beam traveling toward the interface of the two media can be altered such that the intensity of the light entering the second medium approaches zero and substantially all of the light is reflected at the interface. Conversely, for any two transparent media, there is a critical angle of incidence at their interface at or below which substantially all of the incident light will be reflected. This phenomenon, known as total internal reflection, is applied in choosing the refractive indices of the core and the cladding in optical fibers so that light may propagate through the core of the fiber with minimal power loss.

Many other factors affect the propagation of light through the fiber optic core, including the dimensions of the core and the cladding, the wavelength of the light, the magnetic field vectors of the light and electrical field vectors of the light. In addition, many of the physical laws used to determine the ideal propagation of light through a waveguide (optical fiber) assume an "ideal" waveguide, i.e. a straight waveguide with perfect symmetry and no imperfections. For example, the diameter of the core will determine whether the optical fiber is "single mode" or "multimode". The terms single mode and multimode refer to the dimensional orientation of rays propagating through the fiber. Single mode fibers have a core with a relatively small diameter (2-12 microns) and support only one mode of propagation, axial. Multimode fibers have a core with a relatively large diameter (25-100 microns) and permit non-axial rays or modes to propagate through the core. The so-called single mode fibers are actually two mode fibers in the sense that there are two different states of optical polarization that can be propagated through the core. In an ideal, straight, imperfection-free fiber with perfect circular symmetry, the propagation velocity of light is independent of the direction of polarization.

A fiber with an elliptical core will have two preferred directions of polarization (along the major axis and along the minor axis). Linearly polarized light injected into the fiber at any other direction of polarization will propagate in two separate modes that travel at slightly different velocities. This type of fiber is said to have a "modal birefringence". In a real fiber of this type, even ideally polarized light will couple into the other mode due to imperfections in the core-cladding interface, index of refraction fluctuations, and other mechanisms. Static and dynamic changes in polarization may occur along the entire length of the fiber. Over a given distance, the phases of the two modes will pass through an entire cycle of being in phase and out of phase. This distance is known as the "beat length". A long beat length is associated with a small birefringence and a short beat length is associated with a large birefringence. Birefringent optical fibers are also known as "polarization preserving fibers" or "polarization maintaining (PM) fibers". Birefringence is achieved by providing a core with an elliptical cross section or by providing a circular core with a cladding which induces stress on the core. For example, the cladding may be provided with two parallel stress members having longitudinal axes which lie in the same plane as the axis of the core.

Fiber optic sensors employ the fact that environmental effects can alter the amplitude, phase, frequency, spectral content, or polarization of light propagated through an optical fiber. The primary advantages of fiber optic sensors include their ability to be lightweight, very small, passive, energy efficient, rugged, and immune to electromagnetic interference. In addition, fiber optic sensors have the potential for very high sensitivity, large dynamic range, and wide bandwidth. Further, a certain class of fiber sensors may be distributed or multiplexed along a length of fiber.

One type of fiber optic sensor is a side hole fiber optic pressure sensor that has two parallel holes which run the length of the fiber and are parallel to the core. The axes of the holes and the core lie in a common plane. This geometry results in converting external hydrostatic pressure into anisotropic stress at the core thereby inducing birefringence. Jansen and Dabkiewicz in an article entitled "High Pressure Fiber Optic Sensor with Side Hole Fiber", published in SPIE Proceedings, Fiber Optic Sensors II, Vol. 798, pp. 56-60, 1987 describe such a structure. Changes in temperature also affect the birefringence of the core. However, the sensitivity of the side hole fiber sensor to pressure is significantly greater than its sensitivity to temperature. Thus, the side hole fiber optic pressure sensor can be used effectively in applications where temperature variations are minimal. In applications where both temperature and pressure are variable, complex measures must be taken to compensate for the effects of temperature on the birefringence of the sensor and the resulting pressure measurement. Moreover, the relative insensitivity of the side hole fiber optic pressure sensor to temperature makes it unsuitable for measuring temperature. Thus, a separate and distinct temperature sensor co-located with the side hole fiber optic pressure sensor is typically employed for this purpose.

Another type of fiber optic sensor utilizes a fiber Bragg grating. The fiber Bragg grating is formed in the core of the optical fiber by doping an optical fiber with a material such as germanium and then exposing the side of the fiber to an interference pattern to produce sinusoidal variations in the refractive index of the core. Two presently known methods of providing the interference pattern are by holographic imaging and by phase mask grating. Details of the methodology for manufacturing such fiber Bragg gratings are discussed in U.S. Pat. No. 5,380,995. The center wavelength of the spectral envelope reflected by the fiber Bragg grating changes linearly with temperature and strain. Thus, such changes can be measured to derive temperature and strain in the environment of the sensor as described in U.S. Pat. No. 5,380,995.

The fiber Bragg grating can also be formed as part of the core of a side hole fiber optic pressure sensor as described in U.S. Pat. No. 5,841,131. In this structure, the wavelengths of the peaks (and their shift relative to each other) in the spectral envelope reflected by the Bragg grating will change based upon the hydrostatic pressure applied to the sensor. Thus, such changes can be measured to derive pressure in the environment of the sensor. Similar to the side hole fiber optic pressure sensor, temperature affects the birefringence of the core and it is difficult to separate the pressure-related and the temperature-related contributions to the overall wavelength shift in the reflected spectral envelope. Thus, in certain applications where both temperature and pressure are variable, complex measures must be taken to compensate for the effects of temperature on the birefringence. Such complex measures are described by Chmielewska et al. in the article entitled "Measurement of pressure and temperature sensitivities of a Bragg grating imprinted in a highly birefringent side hole fiber," Applied Optics, Vol. 42, No. 21, November, 2003. In this paper, the reflected spectrum is analyzed to identify the wavelength shift at two orthogonal polarization modes ($LP_{01}^x$, $LP_{01}^y$). One of the modes ($LP_{01}^x$) is highly sensitive to temperature yet insensitive to pressure. The other mode ($LP_{01}^y$) is sensitive to both temperature and pressure. These characteristics can be exploited to derive simultaneous temperature and pressure measurements by interrogation of the wavelength shifts at the two polarization modes. However, such compensation schemes are difficult and costly to implement for different applications and installations. Additionally, the wavelength sensitivity to pressure in this approach is quite small (about 1 picometer/18 psi (1 picometer/1.27 kg per square cm)), and it is difficult to achieve better than 0.1 picometer (pm) wavelength resolution with current optical technology. Therefore, it is very difficult to use this approach in most applications in which a high resolution pressure measurement is required. A mechanical amplifier can be applied to the fiber grating in order to increase its pressure sensitivity, but this makes it more difficult to manufacture and creates stability and repeatability problems.

BRIEF SUMMARY OF THE INVENTION

It is therefore an object of the invention to provide a fiber optic sensor (and sensing systems based thereon) that allows for simple and effective compensation for temperature-pressure cross-sensitivity.

It is another object of the invention to provide such a fiber optic sensor (and sensing systems based thereon) that allows for simultaneous measurement of temperature and pressure by the fiber optic sensor.

It is a further object of the invention to provide such a fiber optic sensor (and sensing systems based thereon) that provides distinct components in the spectral envelope reflected by the sensor, wherein one of the components is highly sensitive to temperature (and weakly sensitive to pressure) and another component is highly sensitive to pressure (and weakly sensitive to temperature).

It is also an object of the invention to provide such a fiber optic sensor which is rugged and inexpensive.

In accord with these objects, which will be discussed in detail below, an improved sensing system includes at least one sensor having an enclosure that defines a chamber, a fiber optic segment extending from outside the enclosure into the chamber, and a sequence of optical processing elements operably disposed within the chamber. The elements include a fiber Bragg grating, a polarizer and a first side hole fiber, and a mirror. A light source is arranged to direct light to the sensor(s). A spectral analyzer is arranged to detect light reflected back from the sensor(s). In one embodiment, the light source emits relatively broadband light and the spectral analyzer includes a tunable optical filter. In an alternate embodiment, the light source is a tunable laser device that can be controlled to dynamically vary the wavelength of light emitted therefrom. The fiber Bragg grating substantially reflects a predetermined first spectral envelope while transmitting the remainder of the optical spectrum to the polarizer and side hole fiber. The polarizer, side hole fiber, and mirror cooperate to return an optical signal within a second predetermined spectral envelope. The polarizer is preferably realized by another side hole fiber with liquid metal fill in the side holes. The characteristic wavelength of the peak in the first spectral envelope is highly sensitive to temperature and relatively weakly sensitive to pressure. The optical spectrum within the second spectral envelope is a sine wave shape whose period is highly sensitive to pressure and relatively weakly sensitive to temperature. The spectral analyzer identifies these spectral components to simultaneously derive a measure of temperature and pressure.

It will be appreciated that the components of the sensing system simply and effectively compensate for temperature-pressure cross-sensitivity of the sensor(s). It also provides a sensor that is rugged and inexpensive.

According to one embodiment, the spectral analyzer generates a baseline pressure based upon the characteristic distance between adjacent wavelength peaks in the second spectral envelope, derives a temperature based upon the baseline pressure and the characteristic wavelength of the peak in the first spectral envelope, and then derives a temperature-compensated pressure based upon the temperature and the characteristic distance between adjacent wavelength peaks in the second spectral envelope, Additional objects and advantages of the invention will become apparent to those skilled in the art upon reference to the detailed description taken in conjunction with the provided figures.

DETAILED DESCRIPTION OF THE INVENTION

As used herein, the term "upstream" is generally defined as disposed closer to the light source of the system. Conversely, "downstream" generally means disposed further away from the light source of the system.

Figure 1:
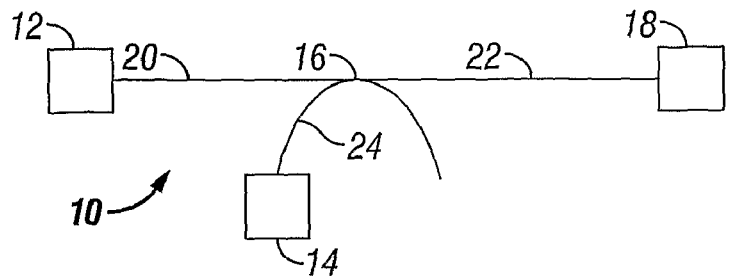
FIG. 1 is a schematic view of a fiber optic sensing system in accordance with the present invention.

Turning now to FIG. 1, an exemplary fiber optic sensing system 10 according to the invention generally includes a light source 12, a beam splitter 16, a spectral analyzer 14 and one or more fiber optic sensors 18. A waveguide 20 (such as a fiber optic waveguide directs the light generated by the light source 12 to the beam splitter 16. The beam splitter 16 directs this light to the fiber optic sensor(s) 18 over fiber optic waveguide 22, where spectral components of such incident light are reflected back along the waveguide 22. The beam splitter 16 directs the desired components of the returning light to the spectral analyzer 14, preferably via a fiber optic waveguide 24. The light source 12 provides different wavelength components and may be realized by a tunable laser, one or more LEDs, one or more laser diodes, or other relatively broad-spectrum sources. The spectral analyzer may be a Fabry-Perot etalon device or other type of device. The waveguides 20, 22, and 24 may be single-mode or polarization-maintaining fiber waveguides.

Figure 2:
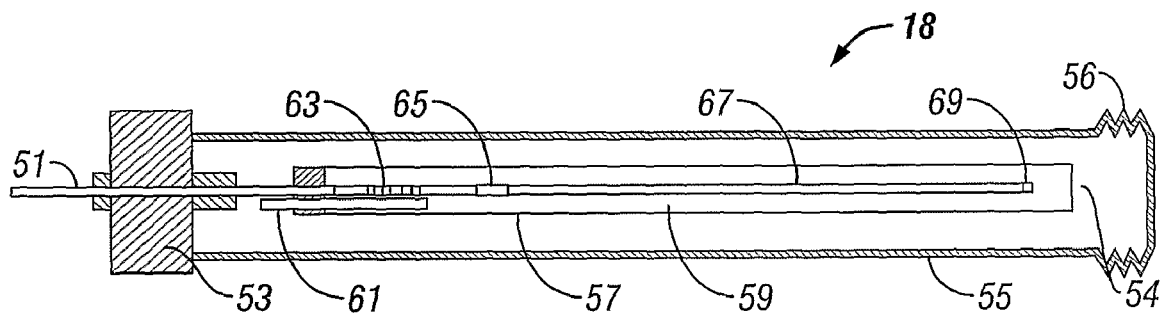
FIG. 2 is a schematic cross sectional view of an exemplary embodiment of the sensor of FIG. 1.

As shown in FIG. 2, the fiber optic sensor 18 includes an optical fiber waveguide section 51 that is part of (or coupled to) the fiber optic waveguide 22. The optical fiber waveguide section 51 passes through an optical feedthrough 53 into a chamber 54 defined by a metal housing 55 (preferably formed from titanium). Hydrostatic pressure applied to the metal housing 55 is transferred to a glass tube 57 that is disposed within the chamber 54. Preferably, such pressure transfer is aided by the use of a bellows structure 56 that is disposed at the end of the metal housing 55 opposite the feedthrough 53. The bellows structure 56 provides for longitudinal deformation of the housing 55 in response to hydrostatic pressures applied to the sensor 18. Such longitudinal deformation varies the volume of the chamber 54, thereby transferring the environmental pressure changes to the glass tube 57. The inside 59 of the glass tube 57 is filled with a metal (e.g., gallium or a gallium alloy) that is in liquid form in the intended operating environment. The inside 59 of the glass tube 57 is also vented to the chamber 54 of the metal tube 55 through a breather capillary 61 to thereby provide for pressure transfer between the chamber 54 of the metal housing 55 and the inside 59 of the glass tube 57. In this construction, the inside 59 of the glass tube 57 forms a pressure chamber operably coupled to the chamber 54 of the metal housing 55, and the metal housing 55 protects the components therein from the environment outside the housing 55. It is therefore suitable for harsh environments such as downhole monitoring in oil and gas drilling and production applications. The optical fiber waveguide section 51 extends into the inside 59 of the glass tube 57 where it is coupled to a sequence of optical processing elements 63, 65, 67, 69 disposed inside the glass tube 57.

Figure 5:
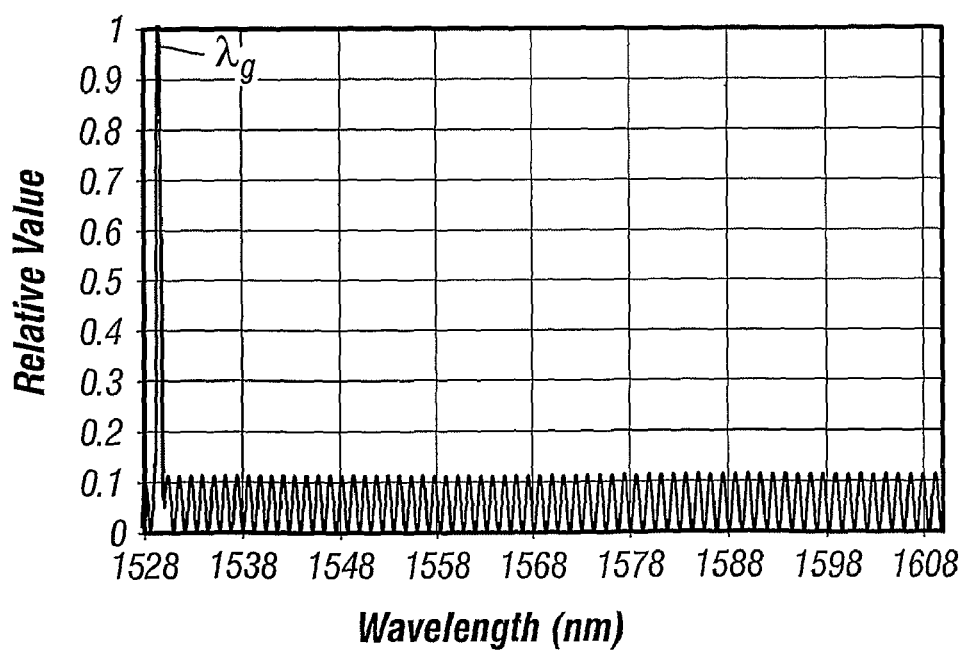
FIG. 5 is a plot of the spectral content of the light reflected from the sensor and analyzed by the spectral analyzer of FIG. 1.
Figure 3:
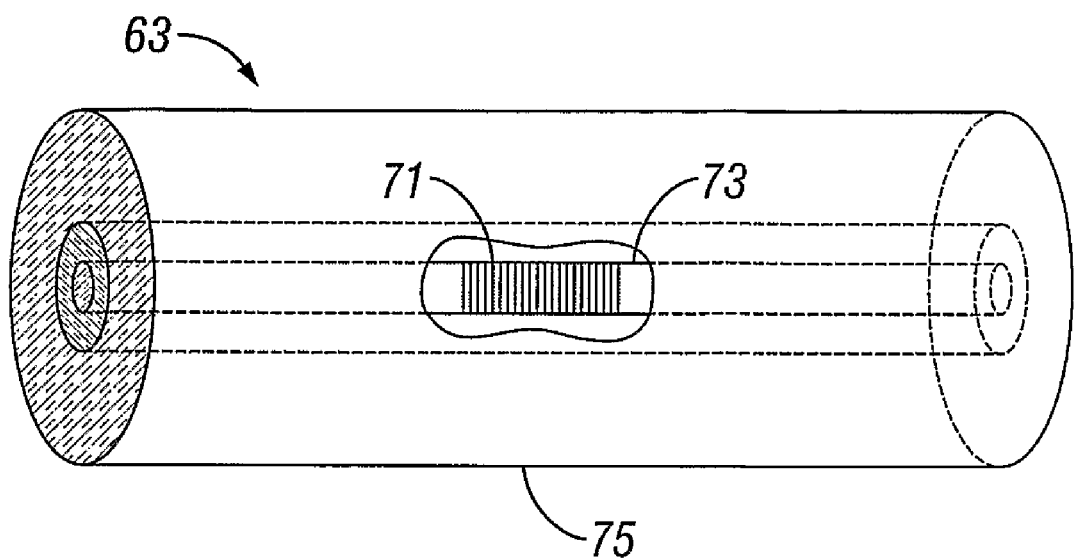
FIG. 3 is a schematic view of the fiber Bragg grating of the sensor of FIG. 2.

As shown in FIG. 3, a first of the optical processing elements is a fiber Bragg grating 63 comprising a grating 71 recorded onto the core 73 of a piece of optical fiber 75 that is mated (preferably by splicing or fusing) to the optical fiber waveguide section 51. The fiber Bragg grating 63 is preferably realized from a polyimide fiber because such material can be adapted to maintain stability at high temperatures (e.g., maintain stability at up to 300° C. when annealed at 400° C.) and exhibit relatively small wavelength drift (e.g., less than 10 pm annually). The fiber Bragg grating 63 substantially reflects a predetermined spectral envelope while transmitting the remainder of the optical spectrum to the polarizer 65 and side hole sensor 67, which are disposed downstream from the fiber Bragg grating 63. The center wavelength of the reflected spectral envelope of the fiber Bragg grating, denoted $\lambda_g$, is highly sensitive to temperature changes experienced by the sensor 18 (and relatively insensitive to changes in hydrostatic pressure experienced by the sensor). In the preferred embodiment, the fiber Bragg grating 63 is apodised and designed to have a narrow reflected optical spectral envelope between about 1510 nm and 1610 nm with a center wavelength $\lambda_g$ as shown in FIG. 5. This reflected spectral envelope is returned back through the optical fiber waveguide section 51, the fiber optic waveguide 22, beam splitter 16, and fiber optic waveguide 24 to the spectral analyzer 14 for processing as set forth below. The fiber Bragg grating 63 will typically have a temperature sensitivity of 10 pm/° C. and a pressure sensitivity of −0.03 pm/psi (−0.43 pm/kg per square cm).

The second optical processing element is a polarizer 65 which linearly polarizes the light passed by the fiber Bragg grating 63 for supply to a length of side hole fiber 67. The polarization axis of the polarizer 65 is oriented at a 45° angle relative to the birefringent axes of the sidehole fiber 67.

Figure 4:
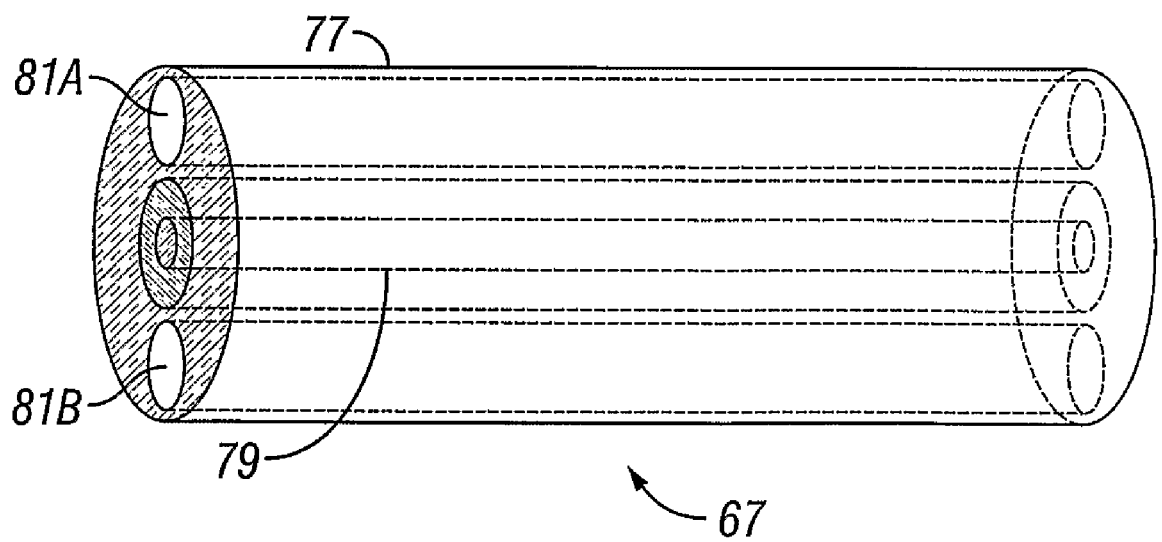
FIG. 4 is a schematic view of the side hole fiber of the sensor of FIG. 2.

The third optical processing element is a side hole fiber 67 which is realized by a length of fiber 77 with an elliptical or circular core 79 and two parallel holes 81A, 81B which run the length of the fiber and are parallel to the core 79 as shown in FIG. 4. The axes of the holes 81A, 81B and the core 79 lie in a common plane.

The polarizer 65 is preferably realized by a short length of side hole fiber (e.g., on the order of 3 mm) with an elliptical or circular core and two parallel holes which run the length of the fiber and are parallel to the core in a manner similar to the side hole fiber of FIG. 4. Moreover, the side holes of the polarizer 65 are centered along a radial line that defines the polarization axis, which is offset at a 45° angle relative to the birefringent axes of the side hole fiber 67 so that equal amounts of light are launched into the x and y polarization axes. In addition, one or both of the side holes of the polarizer are filled with metal (e.g., gallium or a gallium alloy) that is in liquid form in the intended operating environment. The side holes of the polarizer 65 cause a differential loss between the two polarization modes, thus acting to linearly polarize the light passed by the fiber Bragg grating 63. Under applied hydrostatic pressure, the side hole fiber 67 becomes birefringent. The birefringent fiber is highly sensitive to the applied pressure and relatively insensitive to the environmental temperature of the sensor 18. The pressure sensitivity is determined by the length and cross-sectional geometry of the side hole fiber 67.

The downstream end of the side hole fiber 67 is terminated by the fourth optical processing element, a mirror 69, which reflects light back through the side hole fiber 67 and through the polarizer 65 where the two polarization modes interfere. Pressure acting on the side hole fiber 67 induces an optical path length differential between the length seen by the x-polarized light and the length seen by the y-polarized light. This differential optical length $d_s$ is directly proportional to the applied pressure and may be obtained by using a Fast Fourier Transform on the optical spectrum which is formed by the interference of the x and y-polarized beams. The differential optical length $d_s$ is mainly determined by the period of the spectrum. It is highly sensitive to hydrostatic pressure applied to the sensor 18 and relatively insensitive to environmental temperature of the sensor 18. Such interfering light (and the spectral components therein) returns back through the fiber Bragg grating 63, optical fiber waveguide section 51, fiber optic waveguide 22, beam splitter 16, and fiber optic waveguide 24 to the spectral analyzer 14 for processing as set forth below. The side hole fiber 67 can readily be adapted such that its pressure sensitivity is about 25 nm/psi (356 nm/kg per square cm) and its temperature sensitivity is less than 2 nm/° C. in terms of differential optical length changes.

The mirror 69 on the downstream end of the side hole fiber 67 is preferably an in-line fiber mirror with 100 percent reflectivity. The side holes are preferably sealed by fusion splicing and then cleaved before making the mirror 69. The optical signal returned from the polarizer 65 is highly polarized, so the feedthrough 53, optical fiber waveguide section 51, fiber optic waveguide 22, beam splitter 16, fiber optic waveguide 24, and spectral analyzer 14 are required to have low polarization dependent losses.

A fiber feedthrough couples the optical fiber waveguide section 51 and the fiber Bragg grating 63 together. All optical components such as feedthrough 53, fiber Bragg grating 63, polarizer 65, and side hole fiber 67 are fusion spliced together.

The spectral analyzer 14, which is preferably realized by a tunable optical filter, optical receiver, and signal processing circuitry (or possibly multiple copies for parallel optical signal processing channels), operates in two modes. In the first mode, the tunable optical filter is adapted to pass a narrow spectral envelope corresponding to the reflected spectral envelope of fiber Bragg grating 63 of the sensor 18 to the optical receiver. This narrow spectral envelope is swept over the wavelengths in the reflected spectral envelope of the fiber Bragg grating 63 to identify a maximal peak therein. This peak at $\lambda_g$ is representative of the change of the center wavelength of the fiber Bragg grating 63, denoted $\Delta\lambda_g$, which is highly sensitive to environmental temperature of the sensor 18 and relatively insensitive to pressure applied to the sensor 18. In the second mode, the tunable optical filter is adapted to pass a narrow spectral envelope corresponding to the spectral components returned from the polarizer 65 of the sensor 18 to the optical receiver. This narrow spectral envelope is swept over the wavelengths of the spectral components returned from the polarizer 65 to identify the interference optical spectrum. This differential optical length between x and y-polarization modes is representative of the change in the differential optical length between x and y-polarization beams of the side hole fiber 67, denoted $\Delta d_s$, which is highly sensitive to pressure applied to the sensor 18, yet relatively insensitive to environmental temperature of the sensor 18. An exemplary spectral response returned from the sensor 18 is illustrated in FIG. 5. For simplicity of description, the characteristic wavelength of a peak that is identified in the first mode is labeled $\lambda_g$. These two operating modes can be two separate scans, or a single scan then separated into two spectrums by using a special signal processing algorithm.

Given that the initial center wavelength of the Bragg grating is $\lambda_g$, and the initial differential optical length is $d_s$, two simultaneous equations for pressure and temperature measurements derived from the sensor 18 can be described as follows:

$$\Delta\lambda_g = (\alpha_T \times \Delta T) + (\alpha_P \times \Delta P) \tag{1}$$

$$\Delta d_s = \mu(\Delta T) + (\beta_P \times \Delta P) \tag{2}$$

where $\Delta\lambda_g$ is the change in the center wavelength of the fiber Bragg grating 63;

$\Delta d_s$ is the change in differential optical length between x and y-polarization beams of the side hole fiber 67;

$\alpha_T$ and $\alpha_P$ are the temperature and pressure coefficients of the fiber Bragg grating 63, which are calibrated under the condition of the grating filled with liquid metal (e.g., gallium or a gallium alloy);

$\mu(\Delta T)$ is a non-linear function of temperature which is due to fiber dispersion; and $\beta_P$ is a pressure coefficient.

$\mu(\Delta T)$ and $\beta_P$ are calibrated with the sensor filled with liquid metal.

From experimental results, the side hole fiber 67 has very small temperature sensitivity (e.g., much less than 1 psi/° C. (0.0703 kg per square cm/° C.) or 25 nm/° C. in differential optical length). Therefore, the effect of temperature change (e.g., the $\beta(\Delta T)$ part) in equation (2) can be ignored to obtain a baseline pressure change, denoted $\Delta P_{baseline}$. In this manner, the signal processing circuitry utilizes the change in the differential optical length $\Delta d_s$ (calculated in the second mode) to derive the baseline pressure change $\Delta P_{baseline}$ as follows:

$$\Delta P_{baseline} = \frac{\Delta d_s}{\beta_P} \tag{3}$$

It then uses the center wavelength change $\Delta\lambda_g$ (calculated in the first mode) and $\Delta P_{baseline}$ of equation (3) together with equation (1) to derive a pressure-compensated temperature change, denoted $\Delta T_{comp}$ as follows:

$$\Delta T_{comp} = \left(\frac{\Delta\lambda_g}{\alpha_T}\right) - \left(\frac{\alpha_P}{\alpha_T} \times \Delta P_{baseline}\right) \tag{4}$$

The temperature change $\Delta T_{comp}$ calculated in equation (4) is then used in equation (2) to derive a temperature-compensated pressure change, denoted $\Delta P_{comp}$, as follows:

$$\Delta P_{comp} = \frac{1}{\beta_P} \times (\Delta d_s - \mu(\Delta T_{comp})) \tag{5}$$

The signal processing circuitry then analyzes the difference between the baseline pressure change $\Delta P_{baseline}$ and the temperature-compensated pressure change $\Delta P_{comp}$ to determine if the difference is within a predetermined threshold offset value, If so, the signal processing circuitry records the pressure P and temperature T of the sensor as:

$$P = P_{cal} + \Delta P_{comp} \tag{6}$$

$$T = T_{cal} + \Delta T_{comp} \tag{7}$$

where $P_{cal}$ and $T_{cal}$ are the initial pressure and temperature of the calibration.

However, if $\Delta P_{comp} - \Delta P_{baseline}$ is greater than the required pressure accuracy, $\Delta P_{comp}$ is used to replace $\Delta P_{baseline}$ in equation (4) and the iteration process is continued until convergence is achieved.

Advantageously, the components of the sensing system described herein simply and effectively compensate for temperature-pressure cross-sensitivity of the sensor(s). The sensors described herein are inexpensive and rugged, and thus are suitable for harsh environments such as downhole monitoring in oil and gas drilling and production applications.

There have been described and illustrated herein an embodiment of a fiber optic sensing system and fiber optic sensors used therein that provide for simultaneous measurement of temperature and pressure. While a particular embodiment of the invention has been described, it is not intended that the invention be limited thereto, as it is intended that the invention be as broad in scope as the art will allow and that the specification be read likewise. For example, the sensing, system disclosed is merely exemplary of a system in which the fiber optic sensor may be used. Those skilled in the art will appreciate that the fiber optic sensor of the invention may be advantageously used in other types of sensing systems. In addition, it will be understood that multiple sensors may be coupled to a single optical waveguide to provide pressure and temperature measurements from different locations via an optical switch. Those skilled in the art will further understand that small fiber optic sensors according to the invention can be spliced to communications grade fiber optics and located at a detection point relatively distant from the spectral analyzer(s). Moreover, while particular configurations have been disclosed in reference to the optical processing components of the system, it will be appreciated that other configurations could be used as well. For example, the light source may be realized by a tunable laser device that can be controlled to dynamically vary the wavelength of light emitted therefrom. In this configuration, the spectral analyzer need not include a tunable optical filter. It will therefore be appreciated by those skilled in the art that yet other modifications could be made to the provided invention without deviating from its scope as so claimed.

What is claimed is:

1. A sensor apparatus comprising:
   an enclosure defining a chamber;
   a fiber optic segment extending from outside said enclosure into said chamber; and
   a sequence of optical processing elements, operably disposed within said chamber and operably coupled to said fiber optic segment, comprising
      i) a single fiber Bragg grating,
      ii) a polarizer and a first side hole fiber operably disposed downstream from said fiber Bragg grating, and
      iii) a mirror operably disposed downstream from said polarizer and said first side hole fiber; and
   wherein said fiber Bragg grating is adapted to substantially reflect a predetermined first spectral envelope while transmitting the remainder of the optical spectrum to said polarizer and side hole fiber, wherein a characteristic wavelength of a peak within said predetermined first spectral envelope is highly sensitive to temperature and relatively weakly sensitive to pressure in the environment of said sensing apparatus.

2. A sensor apparatus according to claim 1, wherein said polarizer comprises a second side hole fiber.

3. A sensor apparatus according to claim 2, wherein:
   said first side hole fiber has a core and side holes that are radially disposed from its core at a first dimension; and
   said second side hole fiber has a core and side holes that are radially disposed from its core at a second dimension.

4. A sensor apparatus according to claim 2, wherein one or more of the side holes of said second side hole fiber are filled with a liquid metal.

5. A sensor apparatus according to claim 4, wherein said liquid metal comprises gallium or a gallium alloy.

6. A sensor apparatus according to claim 1, wherein said enclosure is operably disposed within the interior of a housing.

7. A sensor apparatus according to claim 6, further comprising a capillary that provides pressure transfer between the interior of said housing and said chamber.

8. A sensor apparatus according to claim 6, wherein said housing includes a feedthrough through which passes said fiber optic segment for supply into said chamber of said enclosure.

9. A sensor apparatus according to claim 6, wherein said housing includes a bellows structure that deforms in response to hydrostatic pressure applied to said sensor apparatus.

10. A sensor apparatus according to claim 1, wherein said fiber Bragg grating is apodized.

11. A sensor apparatus according to claim 10, wherein side holes adjacent said end of said first side hole fiber are sealed by fusion splicing.

12. A sensor apparatus according to claim 1, wherein said mirror is an inline fiber mirror with 100 percent reflectivity.

13. A sensor apparatus according to claim 1, wherein said polarizer has a polarization axis that is offset at an angle of 45 degrees from birefringent axes of said first side hole fiber.

14. A sensing apparatus according to claim 1, wherein:
   said polarizer, said first side hole fiber, and said mirror are adapted to return an optical signal within a predetermined second spectral envelope; and
   the optical spectrum of said optical signal is a sine wave shape whose period is highly sensitive to pressure and relatively weakly sensitive to temperature in the environment of said sensing apparatus.

15. A sensor apparatus, comprising:
   an enclosure defining a chamber, wherein said enclosure comprises a glass tube;
   a fiber optic segment extending from outside said enclosure into said chamber; and
   a sequence of optical processing elements, operably disposed within said chamber and operably coupled to said fiber optic segment, comprising
      i) a single fiber Bragg grating,
      ii) a polarizer and a first side hole fiber operably disposed downstream from said fiber Bragg grating, and
      iii) a mirror operably disposed downstream from said polarizer and said first side hole fiber.

16. A sensor apparatus according to claim 15, wherein said glass tube is filled with a liquid metal.

* * * * *